(12) United States Patent
Angaluri et al.

(10) Patent No.: US 9,692,649 B2
(45) Date of Patent: Jun. 27, 2017

(54) ROLE ASSIGNMENT FOR SERVERS IN A HIGH PERFORMANCE COMPUTING SYSTEM BASED ON MEASURED PERFORMANCE CHARACTERISTICS

(71) Applicant: International Business Machines Corporation, Armonk, NY (US)

(72) Inventors: Srihari V. Angaluri, Raleigh, NC (US); Gary D. Cudak, Creedmoor, NC (US); Christopher J. Hardee, Raleigh, NC (US); Bryan M. Reese, Durham, NC (US); Junjiro Sumikawa, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 14/190,833

(22) Filed: Feb. 26, 2014

(65) Prior Publication Data

US 2015/0244581 A1 Aug. 27, 2015

(51) Int. Cl.
*G06F 15/173* (2006.01)
*H04L 12/24* (2006.01)
*H04L 12/26* (2006.01)

(52) U.S. Cl.
CPC ...... *H04L 41/0823* (2013.01); *H04L 41/0883* (2013.01); *H04L 43/065* (2013.01)

(58) Field of Classification Search
CPC .................. H04L 41/0823; H04L 41/0883
See application file for complete search history.

(56) References Cited

U.S. PATENT DOCUMENTS

| | | | |
|---|---|---|---|
| 7,769,735 B2 | 8/2010 | Wasserman et al. | |
| 7,827,435 B2 | 11/2010 | Sahoo et al. | |
| 8,209,272 B2 | 6/2012 | Little | |
| 8,255,516 B1 | 8/2012 | Zhang et al. | |
| 8,468,246 B2 | 6/2013 | Mays et al. | |
| 8,521,922 B2 | 8/2013 | Haustein et al. | |
| 9,077,580 B1* | 7/2015 | Randhawa | H04L 29/06 |
| 9,213,581 B2* | 12/2015 | Klemba | G06F 9/5072 |
| 2004/0039815 A1 | 2/2004 | Evans et al. | |
| 2006/0025981 A1 | 2/2006 | Papaefstathiou et al. | |

(Continued)

FOREIGN PATENT DOCUMENTS

CN 100451970 C 1/2009

*Primary Examiner* — Arvin Eskandarnia
*Assistant Examiner* — Austin Moreau
(74) *Attorney, Agent, or Firm* — Brandon C. Kennedy; Grant A. Johnson; Kennedy Lenart Spraggins LLP (57) ABSTRACT

Embodiments of the present invention disclose a method, computer program product, and for determining a recommendation relating to a configuration of a plurality of server nodes of a computing system. In one embodiment, in accordance with the present invention, the computer implemented method includes the steps of, for each server node, storing a first performance parameter value, wherein each first performance parameter value is a benchmarked value that corresponds to a measured actual performance parameter of its associated server node, and applying a first configuration rule based, at least in part, on the first performance parameter values of the plurality of server nodes to obtain a first configuration recommendation. In another embodiment, the method further includes the step of presenting the first recommendation to a human user.

12 Claims, 5 Drawing Sheets

(56) References Cited

U.S. PATENT DOCUMENTS

| | | |
|---|---|---|
| 2006/0117208 A1 | 6/2006 | Davidson |
| 2011/0219208 A1* | 9/2011 | Asaad .................... G06F 15/76 |
| | | 712/12 |
| 2012/0173708 A1 | 7/2012 | Bartfai-Walcott et al. |
| 2012/0297251 A1 | 11/2012 | Masser et al. |
| 2013/0159380 A1 | 6/2013 | Alam et al. |
| 2013/0204948 A1 | 8/2013 | Zeyliger et al. |
| 2013/0254428 A1* | 9/2013 | Kodama ............... G06F 15/161 |
| | | 709/250 |

* cited by examiner

ROLE ASSIGNMENT FOR SERVERS IN A HIGH PERFORMANCE COMPUTING SYSTEM BASED ON MEASURED PERFORMANCE CHARACTERISTICS

FIELD OF THE INVENTION

The present invention relates generally to the field of High Performance Computing (HPC) systems, and more particularly to configuration of servers within an HPC system.

BACKGROUND

High performance computing (HPC) tasks typically require large amounts of computing power for relatively short periods of time, and HPC systems typically deal with tightly coupled parallel jobs. As such, HPC systems typically must execute within a particular site with low-latency interconnects.

High performance computing generally refers to the practice of aggregating computing power in a manner that delivers very high performance relative to the performance of a typical desktop computer or workstation. HPC systems (e.g., HPC systems that use supercomputers to achieve the large amounts of required computing power) typically: (i) are large installations; (ii) include a plurality of sub-systems (e.g., server computer nodes); and (iii) use different server computer nodes to respectively accomplish different "roles." Some examples of "roles" within an HPC system include storage, management, login, compute, and bridge.

HPC systems have a prevalent role in the field of computational science, and are utilized for a wide array of computationally intensive tasks in a plurality of subject areas, which include quantum mechanics, weather forecasting, molecular modeling, climate research, cryptanalysis, and physical simulation. An HPC system can be composed of a multitude of server racks, each rack including a multitude of server and system nodes, and each server or system node including a multitude of computer components (e.g., computer processors, computer memory, I/O devices, storage, etc.).

High Throughput Computing (HTC) tasks also require large amounts of computing, but for much longer times, typically months and years, rather than hours and days. A primary interest in the field of HTC is how many jobs can be completed over a long period of time instead of how fast an individual job can complete. Many-task computing (MTC) is aimed at bridging the gap between the two computing paradigms of HTC and HPC. MTC is similar to HTC, but differs in the emphasis of utilizing many computing resources over short periods of time to accomplish many computational tasks (i.e. including both dependent and independent tasks), where the primary metrics are measured in seconds (e.g., Floating-point operations per second (FLOPS), tasks/s, Megabytes (MB)/s I/O rates), as opposed to operations (e.g., jobs) per month.

SUMMARY

Embodiments of the present invention disclose a method, computer program product, and system for determining a recommendation relating to a configuration of a plurality of server nodes of a computing system. In one embodiment, in accordance with the present invention, the computer implemented method includes the steps of, for each server node, storing a first performance parameter value, wherein each first performance parameter value is a benchmarked value that corresponds to a measured actual performance parameter of its associated server node, and applying a first configuration rule based, at least in part, on the first performance parameter values of the plurality of server nodes to obtain a first configuration recommendation. In another embodiment, the method further includes the step of presenting the first recommendation to a human user.

DETAILED DESCRIPTION

Embodiments of the present invention determine recommendations for a configuration of server nodes within an HPC system. In one embodiment, performance characteristics of each server node within server rack of an HPC system is determined and stored. Recommendations for a configuration of server nodes in server racks of the HPC system are determined based on the determined performance characteristics. The determined recommendations for server nodes can include: (i) recommended role assignment of server nodes; (ii) recommended relative positions within a rack for its various server nodes; (iii) for each server node, a recommended rack in which to install that server node in; and (iv) a configuration of components of server nodes.

Some embodiments of the present invention recognize that each system role within an HPC system has certain associated performance characteristics that relate to how well a server node (or set of server nodes) can perform that particular system role. For example, compute server nodes benefit from higher performing central processing units (CPUs). In a plurality of server nodes, hardware components of the server nodes may not have uniform performance between each server node, even if the server nodes are of the same type. Accordingly, some embodiments of the present invention measure and/or approximate performance characteristics in a way that goes beyond merely determining the "factory specs" of a server node. For example, performance characteristics include benchmarked values that correspond to measured actual performance capabilities of components of server nodes.

Figure 1:
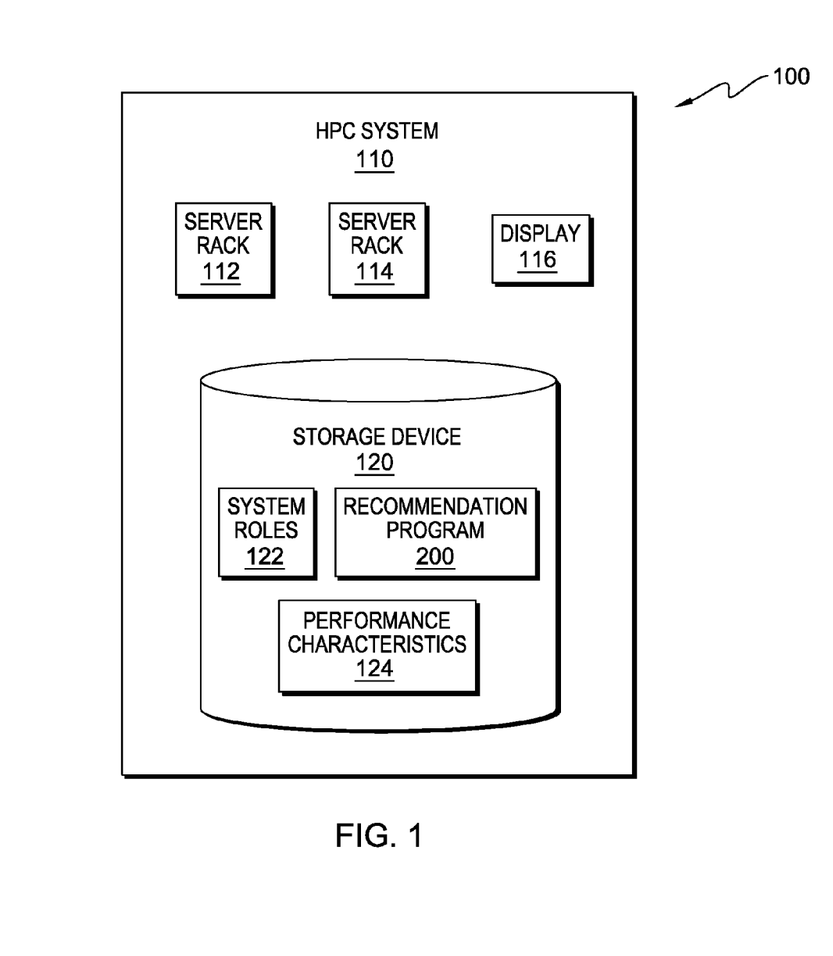
FIG. 1 is a functional block diagram of a data processing environment in accordance with an embodiment of the present invention.

One, or more, embodiments of the present invention will now be described in detail with reference to the Figures. FIG. 1 is a functional block diagram illustrating data processing environment 100, in accordance with one embodiment of the present invention. Environment 100 includes High Performance Computing (HPC) system 110. In this embodiment, HPC system 110 is a supercomputer. Alternatively, an HPC system may take the form of: (i) another kind of computer installation that includes a plurality of computing systems (e.g., server computer nodes) and corresponding roles for the computing systems; or (ii) any type or configuration of a computing system that includes one or more server nodes (e.g., a data center, a cloud computing environment, etc.). In embodiment 100, the roles of HPC system 110 are as follows: storage, management, login, compute, and bridge. In one embodiment, HPC system 110 includes server racks 112 and 114 (additional server racks not shown for clarity of illustration purposes), display 116, and storage device 120.

Figure 3A:
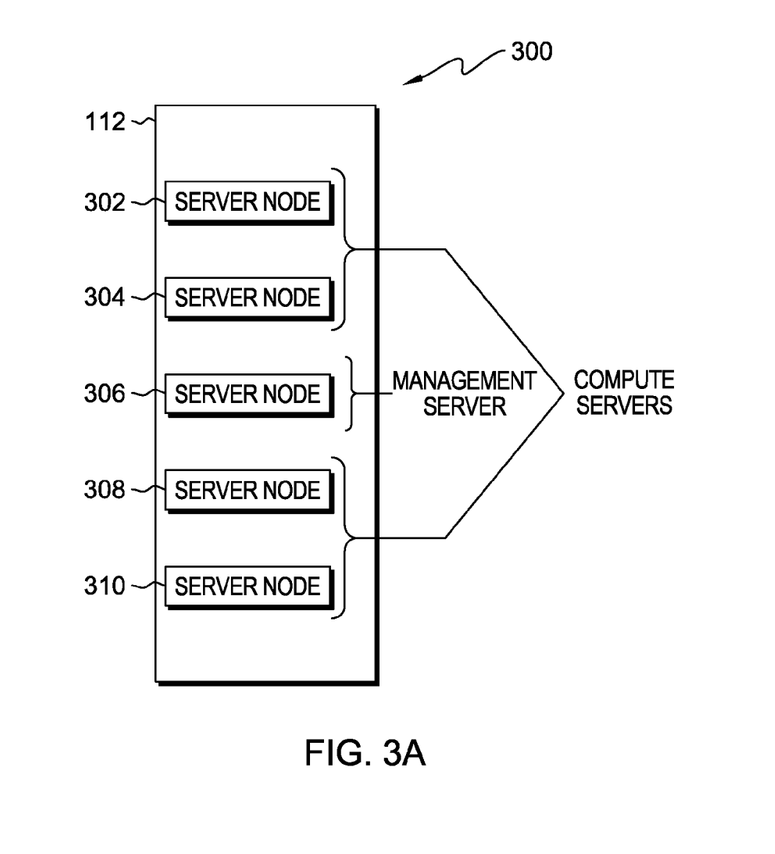
FIGS. 3A, 3B and 3C illustrate example configurations for server nodes with a server rack, in accordance with an embodiment of the present invention.

In the embodiment of environment 100, server racks 112 and 114 each include a plurality of server nodes. Server rack 112 includes server nodes that serve the compute and management roles in HPC system 110. Server rack 114 includes server nodes that serve the storage role in HPC system 110. Other racks (not separately shown) correspond to other roles within HPC system 110. The constituent server nodes within a server rack correspond to different functions within the scope of the role played by that server rack (e.g., compute, storage, and management roles). FIG. 3A depicts example server rack 300, which is an example of server rack 112 including server nodes 302, 304, 306, 308 and 310 and an indication of a role corresponding to each server node. In example server rack 300, server nodes 302, 304, 308 and 310 are compute servers, and server node 306 is a management server. In other embodiments, the HPC system can include any number of instances of server racks 112 and 114 (i.e., more server racks, or fewer server racks).

In example embodiments, the server nodes within server racks 112 and 114 (e.g., server nodes 302, 304, 306, 308 and 310 of example server rack 300) can be desktop computers, computer servers, or any other computer systems known in the art capable of performing functions in accordance with embodiments of the present invention. In certain embodiments, the server nodes represent computer systems utilizing clustered computers and components (e.g., database server computers, application server computers, etc.), that act as a single pool of seamless resources when accessed by elements of data processing environment 100 (e.g., HPC system 110). In general, the server nodes are representative of any electronic device or combination of electronic devices capable of executing machine-readable program instructions, as described in greater detail with regard to FIG. 4, in accordance with embodiments of the present invention. The server nodes of server racks 112 and 114 can each be of the same server model family (e.g., a series of server blades), or can be different types of server nodes. In an example embodiment, server racks 112 and 114 each include a plurality of server nodes, and each server node includes hardware components. Some examples of hardware components of server nodes include computer memory (e.g., dynamic random access memory (DRAM)), CPUs, I/O devices (e.g., I/O cards), and storage capacity (e.g., hard disk drives (HDD)).

Display 116 is a computer monitor. Alternatively, any other kind of display device (now known or to be developed in the future) may be used. In some embodiments, the display may be in the form of a system panel that is located on one or more of server racks 112, 114. Display 116 displays data associated with components of HPC system 110. In this embodiment, display 116 further includes a user interface hardware set (not separately shown) used to receive user input. In this example, the user interface hardware set includes a touch screen interface, a keyboard input and voice command receiving hardware.

Storage device 120 includes recommendation program 200, system roles 122, and performance characteristics 124. Storage device 120 can be implemented with any type of storage device, for example, persistent storage 408, which is capable of storing data that may be accessed and utilized by HPC system 110 and server racks 112 and 114, such as a database server, a hard disk drive, or flash memory. In other embodiments, storage device 120 can represent multiple storage devices within HPC system 110. In example embodiments, recommendation program 200 determines and provides recommendations for a configuration of HPC system 110, in accordance with embodiments of the present invention.

A system role 122 is assigned to each server node of HPC system 110. Alternatively, a server node can be associated with more than one system role (e.g., a server node having both compute and management roles). Each role respectively corresponds to a category of tasks and activities that the HPC system performs. HPC system 110 has the following roles: storage, management, login, compute, gateway, and bridge. Each instance of a server node within server racks 112 and 114 of HPC system 110 has a corresponding association in system roles 122. In an example with regard to example server rack 300, server nodes 302, 304, 308 and 310 are associated with the role of compute servers, and server node 306 is associated with the role of a management server. System roles 122 include data indicating which server nodes are associated with which roles within HPC system 110. For example, the data included in system roles indicates that the serial number of server node 308, in example server rack 300, corresponds to the role of a compute server. Each role of system roles 122 has at least one associated definable "performance parameter," which, in this example, is defined by the system administrator.

As an example of a role and associated performance parameter, for the role of "compute," one associated performance parameter is the amount of processing power that the CPU (central processing unit) of a compute-role server node has. As will be further explained below, configuration rules relate to performance parameters of the various roles. For example, one configuration rule in the embodiment of environment 100 is that a server node to be assigned the role of "compute" must have at least a certain threshold amount of processing power. More specifically, under this exemplary rule: (i) the precondition is that a given server node has a CPU processing power value that is below a threshold value T; and (ii) the configurational consequence is that the given server node will not be recommended to not be assigned to a "compute" role.

Performance characteristics 124 include benchmark data indicating measured performance parameters of each server node present in the embodiment of environment 100. Performance characteristics 124 are organized according to the serial number of the server nodes. For example, the serial number of server node 302 (of example server rack 300) is associated with benchmark data for each of its measured performance parameters (e.g., CPU processing power, amount of computer memory, I/O device speeds, amount of storage, etc.). In the embodiment of environment 100, the benchmark data for each server node is measured and collected during, or at the completion of, the manufacturing process of the server node. In the embodiment of environment 100, determination of the benchmark data stored in performance characteristics 124 is measured and collected via automated performance benchmarking software. More specifically, the automated performance benchmarking software is included as an initial boot stage or runtime test associated with a unified extensible firmware interface (UEFI) associated with a server node.

With regard to example server rack 300, each server node within server rack 112 (i.e., server nodes 302, 304, 306, 308 and 310) have corresponding instances of data in performance characteristics 124. In this example, for server node 302, measurement of performance characteristics 124 occurs during the initial boot phase of server node 302. To measure and determine the performance characteristics corresponding to server node 302, hardware components (e.g., CPUs, computer memory, I/O devices, storage, etc.) of server node 302 undergo benchmark testing, and the results are stored in storage device 120 as performance characteristics 124. The stored data in performance characteristics 124 is associated with the serial number of server node 302. In another example, the results of benchmark testing (i.e., performance characteristics 124) are stored in the BIOS or UEFI of the corresponding server node. The measurement and determination process for the actual performance characteristics of the server nodes is performed (and stored) for each instance of a server node that is to be included in server racks 112 and 114 of HPC system 110.

In another embodiment, storage device 120 and display 116 are on one or more remote servers that are connected to HPC system 110 via network communications. Network communications can be, for example, a local area network (LAN), a telecommunications network, a wide area network (WAN) such as the Internet, or a combination of the three, and include wired, wireless, or fiber optic connections. In general, network communications can be any combination of connections and protocols that will support communications between HPC system 110, server racks 112 and 114, display 116, and storage device 120 in accordance with embodiments of the present invention.

Figure 2:
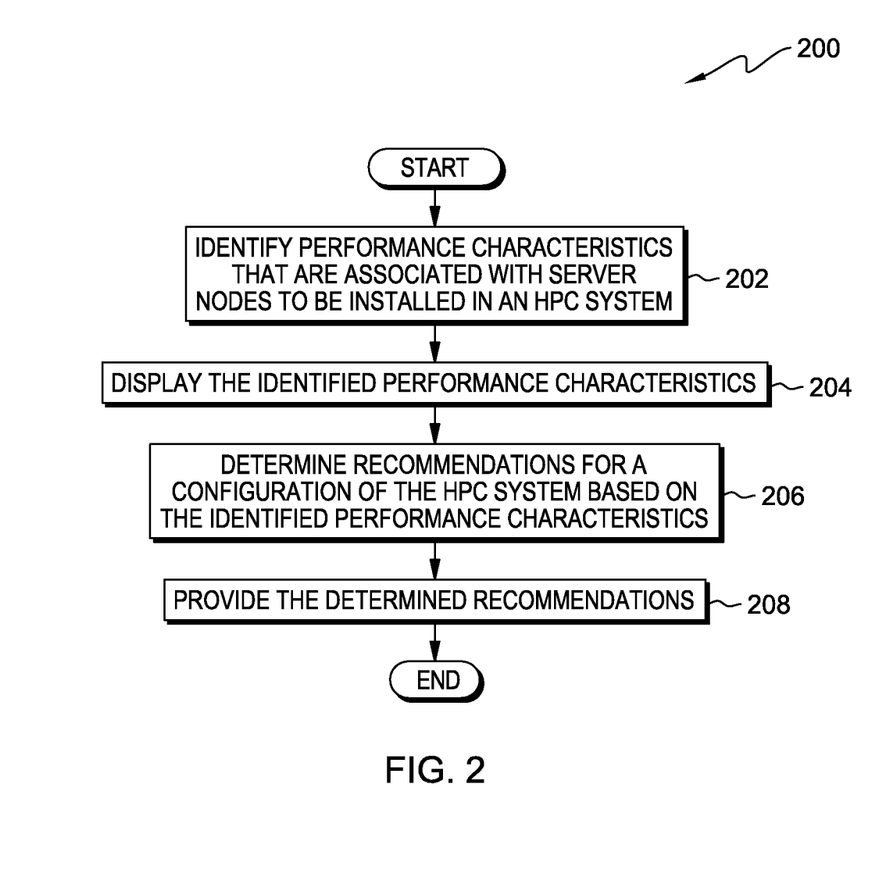
FIG. 2 is a flowchart depicting operational steps of a program for determining and providing recommendations for a configuration of a HPC system, in accordance with an embodiment of the present invention.

FIG. 2 is a flowchart depicting operational steps of recommendation program 200 in accordance with an embodiment of the present invention. Recommendation program 200 initiates and operates during manufacturing and assembly of server racks 112 and 114, and operates to determine recommendations for the configuration of each server node within server racks 112 and 114.

In step 202, recommendation program 200 identifies performance characteristics that are associated with server nodes to be installed in a HPC system. More specifically, recommendation program 200 identifies data in performance characteristics 124 associated with each server node that is to be installed in server rack 112 of HPC system 110. As shown in configuration 300 of server rack 112 as shown in FIG. 3A, at step 202, when recommendation program 200 identifies benchmark data in performance characteristics 124, server nodes 302, 304, 306, 308 and 310 are in an initial configuration that has not yet been optimized based on an application of configuration rules. Rather, the server nodes are randomly positioned within server rack 112, without regard for the role which each server node 302, 304, 306, 308 and 310 will be expected to perform.

In step 204, recommendation program 200 displays the identified performance characteristics. More specifically, recommendation program 200 displays the identified data from performance characteristics 124 (from step 202) on display 116. Recommendation program 200: (i) displays on display 116 indications of the benchmarked data for each of the server nodes; (ii) displays on display 116 performance parameters that are relevant to each role; and (iii) receives user input via the user interface hardware set of display 116.

In step 206, recommendation program 200 determines recommendations for a configuration of the HPC system based on the identified performance characteristics. More specifically, recommendation program 200 applies a set of configuration rules based on the nature of the HPC system and the benchmark data of the server nodes that are to be used to build the HPC system. In this example, the recommended aspects of configuration are: (i) recommended role assignment of server nodes; (ii) recommended relative positions within a rack for its various server nodes; (iii) for each server node, a recommended rack in which to install that server node in; and (iv) a configuration of components of server nodes. In this way, recommendation program 200 operates to determine an optimal configuration of available server nodes for HPC system 110, based on relevant performance parameters of the constituent server nodes.

One example of a configuration rule was explained above where certain servers were disqualified from acting in the "compute" role because they had processor power below some minimum threshold T. In this example, all of nodes 302, 304, 306, 308, 310 have a processing power greater than the minimum threshold, and, therefore, all of these nodes qualify to be recommended for assignment as "compute" nodes.

A further example of a configuration rule follows: (i) configuration precondition: a server node has more non-volatile storage than any of the other server nodes available for role assignment; and (ii) configuration consequence: that server node with the most storage space is recommended to be assigned a management role. In this example, server node 302 has the most storage space and is recommended for assignment to a management role.

In step 208, recommendation program 200 provides the determined recommendations that have been determined based on the performance parameters through the machine logic of the configuration rules. In one embodiment, recommendation program 200 displays the determined recommendations (from step 206) on display 116. A user associated with HPC system 110 (e.g., a system administrator) can then configure HPC system 110 based on the provided recommendations. In an example embodiment, recommendation program 200 provides configuration recommendations in a format indicating at least: a serial number of a server node, an associated role to be assigned to the server node, and an installation location of the server node.

In example embodiments, the depicted configuration of server nodes in example server rack 300 (FIG. 3A) does not take into account performance characteristics 124 associated with server nodes 302, 304, 306, 308 and 310 (i.e., server nodes are randomly positioned within server rack 112, without regard for role).

In one example, recommendation program 200 identifies data in performance characteristics 124 corresponding to server nodes of example server rack 300 that indicates the benchmarked performance values of server nodes 302, 304, 306, 308 and 310 (in step 202). Recommendation program 200 identifies that data of performance characteristics 124 indicates that server node 302 has a low performing CPU relative to server node 306, which has a higher performing CPU. In this example, recommendation program 200 determines a recommendation that server node 306 should be assigned a compute role, and server node 306 should be assigned a management role (e.g., in system roles 122).

Figure 3B:
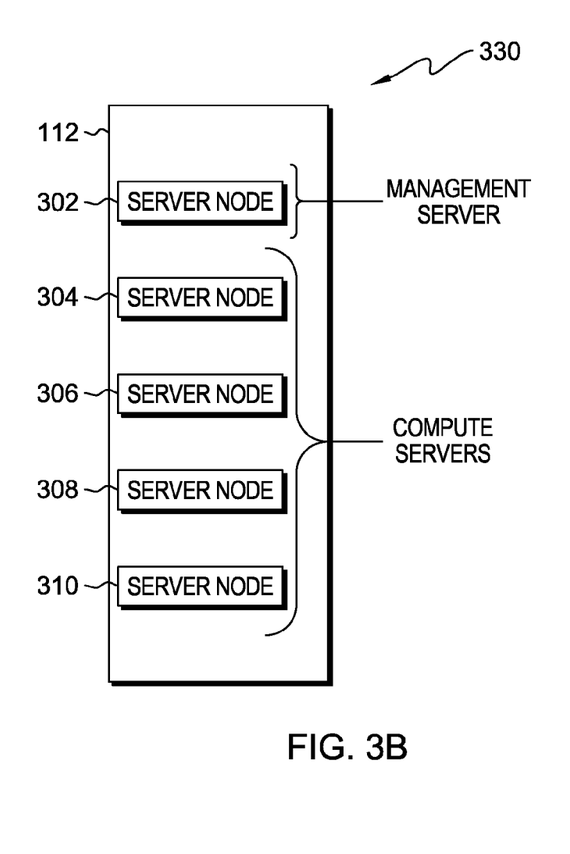

FIG. 3B, configuration recommendation 330, depicts one possible configuration recommendation that recommendation program 200 can determine (in step 206). In configuration recommendation 330, server nodes 302, 304, 306, 308 and 310 have the same physical location as in example server rack 300, but server node 302 (identified as having a low performing CPU) is assigned a management role, and server nodes 304, 306, 308 and 310 (server node 306 identified as having a high performing CPU) are assigned compute roles. In this example, recommendation program 200 modifies system roles 122 of server rack 112 to correspond to the physical locations depicted in configuration recommendation 330.

Figure 3C:
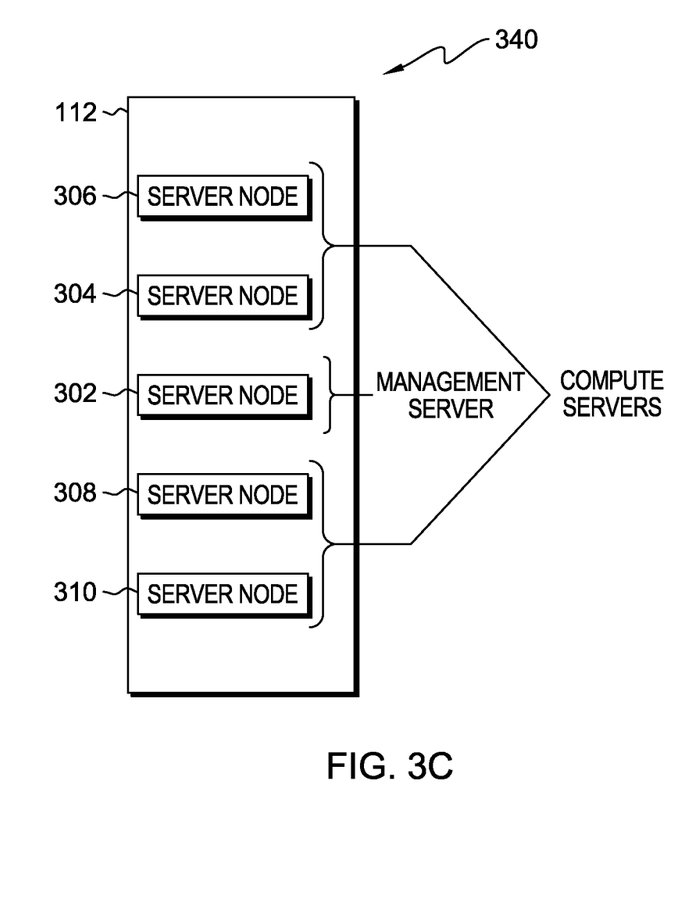

FIG. 3C, configuration recommendation 340, depicts another possible configuration recommendation that recommendation program 200 can determine (in step 206). In configuration recommendation 340, the physical locations of server nodes 302, 304, 306, 308 and 310 are different than example server rack 300, but the configuration locations for system roles 122 (i.e., compute and management) are the same. With regard to this example, recommendation program 200 determines a recommendation to switch the physical locations of server node 302 (identified as having a low performing CPU) and server node 306 (identified as having a high performing CPU). In addition, recommendation program 200 changes the corresponding association in system roles 122 for server node 302 from a compute role to a management role, and for server node from a management role to a compute node. In another embodiment, if the association to system roles 122 for server nodes corresponds to the physical location within server rack 122, then installing server node 302 in a position designated as a management role results in server node 302 being assigned the role of a management server in system roles 122. For example, in some systems management server nodes are located near the center of a server rack.

In another example, recommendation program 200 identifies data in performance characteristics 124 corresponding to server nodes of example server rack 300 that indicates the benchmarked performance values of server nodes 302, 304, 306, 308 and 310 (in step 202). Recommendation program 200 identifies that data of performance characteristics 124 indicates that server node 308 has high performing I/O devices. In this example, recommendation program 200 determines a recommendation that server node 308 should be installed as in a storage server rack (e.g., server rack 114) and assigned a role of a storage server in system roles 122. In another embodiment, recommendation program 200 determines a recommendation that includes reallocating components of server nodes. For example, recommendation program 200 recommends that a server node with high performing I/O devices can switch I/O devices with a server node with lower performing I/O devices. In another example, recommendation program 200 recommends that I/O devices can be removed from a server node with high performing I/O devices, and the removed I/O devices can be put into a server node with lower performing I/O devices.

In another example embodiment, in step 206 recommendation program 200 determines recommendations for a reconfiguration for server nodes that are already installed in an HPC system (e.g., an instance of HPC system 110 where server racks 112 and 114 are assembled and populated with server nodes with associated roles). For example, with regard to this embodiment, example server rack 300 depicts an existing configuration of server nodes 302, 304, 306, 308 and 310 and the corresponding associations in system roles 122 for the server nodes. In this example, configurations recommendations 330 and 340 (FIGS. 3B and 3C respectively) depict potential reconfiguration recommendations for server rack 112 that recommendation program 200 can determine and provide.

With respect to configuration recommendation 330, recommendation program 200 can determine a recommendation of reconfiguring server rack 112 via swapping associations in system roles 122 for server node 302 (identified as having a low performing CPU in step 202) from the role of a compute node to the role of a management node and for server node 306 (identified as having a high performing CPU in step 202) from the role of a management node to the role of a compute node. With respect to configuration recommendation 340, recommendation program 200 can determine a recommendation of reconfiguring server rack 112 to physically swap (e.g., by an individual associated with HPC system 110) server node 302 and server node 306. In this example, the physical locations of the association in system roles 122 remains unchanged (e.g., the management server role remains in the middle of server rack 112), but along with the physical locations of server nodes 302 and 306 changing, the associations are reconfigured in system roles 122 for server node 302 (identified as having a low performing CPU in step 202) from the role of a compute node to the role of a management node and for server node 306 (identified as having a high performing CPU in step 202) from the role of a management node to the role of a compute node.

Figure 4:
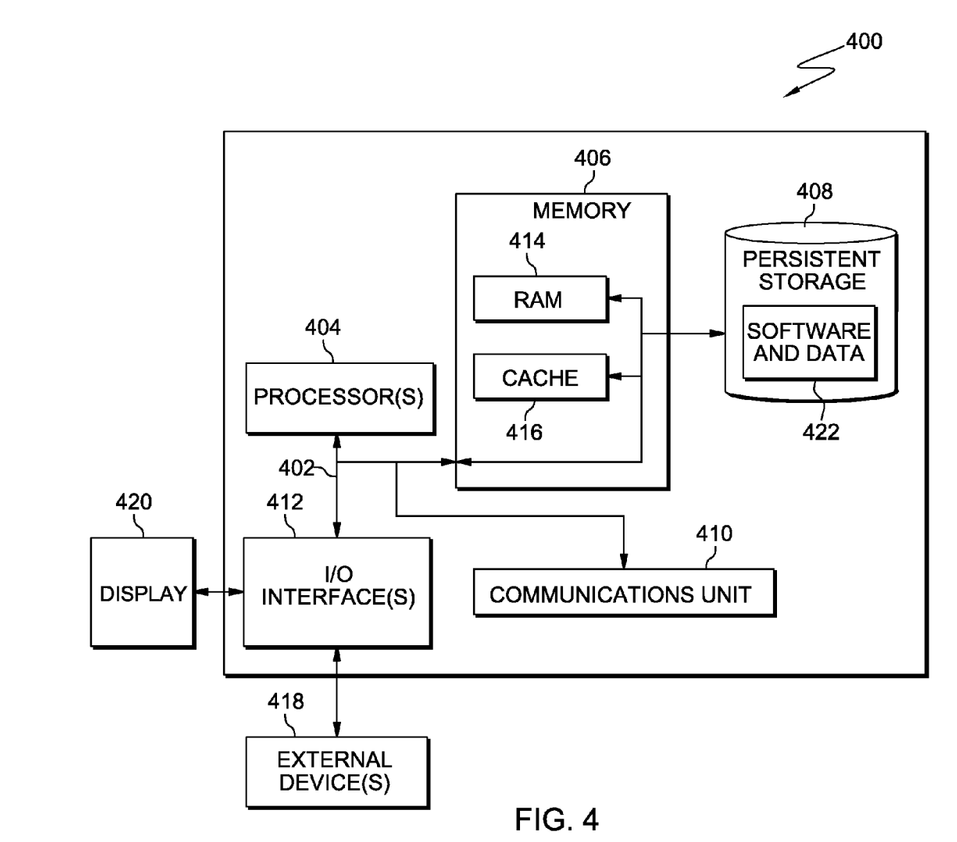
FIG. 4 depicts a block diagram of components of the computing system of FIG. 1 in accordance with an embodiment of the present invention.

FIG. 4 depicts a block diagram of components of computer 400, which is representative of HPC system 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are examples of computer readable tangible storage devices. A storage device is any piece of hardware that is capable of storing information, such as, data, program code in functional form, and/or other suitable information on a temporary basis and/or permanent basis. In this embodiment, memory 406 includes random access memory (RAM) 414 and cache memory 416. In general, memory 406 can include any suitable volatile or non-volatile computer readable storage device. Software and data 422 are stored in persistent storage 408 for access and/or execution by processors 404 via one or more memories of memory 406. With respect to HPC system 110, software and data 422 represents recommendation program 200, system roles 122, and performance characteristics 124.

In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 may include one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data 422 can be stored on such portable computer readable storage media and can be loaded onto persistent storage 408 via I/O interface(s) 412. I/O interface(s) 412 also can connect to a display 420.

Display 420 provides a mechanism to display data to a user and may be, for example, a computer monitor. Display 420 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions, which execute on the computer, other programmable apparatus, or other device, implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for configuration of a plurality of server nodes of a high performance computing (HPC) system, the method comprising the steps of:
   measuring a benchmarked value of an actual performance parameter for each server node, wherein measuring the benchmarked value of the actual performance parameter for each server node comprises:
      executing a performance test at an initial boot stage of each server node; and
      storing, on the HPC system, the benchmarked value with an identifier of the server node;
   comparing the benchmarked value of the actual performance parameter for each server node to a threshold value;
   determining a configuration recommendation based on the comparison of the benchmarked value of the actual performance parameter to the threshold value, and at least one configuration rule, wherein the configuration recommendation comprises an installation location of each server node; and
   configuring the plurality of server nodes in dependence upon the configuration recommendation, including assigning to at least one server node an HPC system role, HPC system roles including storage, management, login, compute, and bridge.

2. The method of claim 1, wherein configuring includes positioning, relative to one another within a rack, server nodes in the rack.

3. The method of claim 1, wherein configuring includes: selecting a rack for a first server node; and installing the first server node in the selected rack.

4. The method of claim 1, wherein configuring includes configuring components within a first server node of the plurality of server nodes.

5. A computer program product for configuration of a plurality of server nodes of a high performance computing (HPC) system, including one or more computer readable storage media and program instructions stored on at least one of the one or more storage media, wherein execution of the program instructions by one or more processors of a computer system causes the one or more processors to carry out the acts of:
   measuring a benchmarked value of an actual performance parameter for each server node, wherein measuring the benchmarked value of the actual performance parameter for each server node comprises:
      executing a performance test at an initial boot stage of each server node; and
      storing, on the HPC system, the benchmarked value with an identifier of the server node;
   comparing the benchmarked value of the actual performance parameter for each server node to a threshold value;
   determining a configuration recommendation based on the comparison of the benchmarked value of the actual performance parameter to the threshold value, and at least one configuration rule, wherein the configuration recommendation comprises an installation location of each server node; and
   configuring the plurality of server nodes in dependence upon the configuration recommendation, including assigning to at least one server node an HPC system role, HPC system roles including storage, management, login, compute, and bridge.

6. The computer program product of claim 5, wherein configuring includes positioning, relative to one another within a rack, server nodes in the rack.

7. The computer program product of claim 5, wherein configuring includes: selecting a rack for a first server node; and installing the first server node in the selected rack.

8. The computer program product of claim 5, wherein configuring includes configuring components within a first server node of the plurality of server nodes.

9. A computer system for configuration of a plurality of server nodes of a computing system, the computer system comprising:
   one or more computer processors;
   one or more computer readable storage media; and
   program instructions stored on the computer readable storage media for execution by at least one of the one or more processors, the program instructions functioning by:
   measuring a benchmarked value of an actual performance parameter for each server node, wherein measuring the benchmarked value of the actual performance parameter for each server node comprises:
      executing a performance test at an initial boot stage of each server node; and
      storing, on the HPC system, the benchmarked value with an identifier of the server node;
   comparing the benchmarked value of the actual performance parameter for each server node to a threshold value;
   determining a configuration recommendation based on the comparison of the benchmarked value of the actual performance parameter to the threshold value, and at least one configuration rule, wherein the configuration recommendation comprises an installation location of each server node; and
   configuring the plurality of server nodes in dependence upon the configuration recommendation, including assigning to at least one server node an HPC system role, HPC system roles including storage, management, login, compute, and bridge.

10. The computer system of claim 9, wherein configuring includes positioning, relative to one another within a rack, server nodes in the rack.

11. The computer system of claim 9, wherein configuring includes: selecting a rack for a first server node; and installing the first server node in the selected rack.

12. The computer system of claim 9, wherein configuring includes configuring components within a first server node of the plurality of server nodes.

* * * * *